US012698195B2

(12) United States Patent
Banhidai et al.

(10) Patent No.: US 12,698,195 B2
(45) Date of Patent: Aug. 4, 2026

(54) METHODS AND SYSTEMS FOR MAINTAINING CARBONATION LEVELS IN BEVERAGES USING DYNAMIC CARBONATION PRECONDITIONING

(71) Applicant: COORS BREWING COMPANY, Milwaukee, WI (US)

(72) Inventors: Peter Banhidai, Hertfordshire (GB); Jon Standen, Staffordshire (GB)

(73) Assignee: COORS BREWING COMPANY, Milwaukee, WI (US)

( * ) Notice: Subject to any disclaimer, the term of this patent is extended or adjusted under 35 U.S.C. 154(b) by 17 days.

(21) Appl. No.: 18/683,322

(22) PCT Filed: Aug. 9, 2022

(86) PCT No.: PCT/US2022/039850
§ 371 (c)(1),
(2) Date: Feb. 13, 2024

(87) PCT Pub. No.: WO2023/022903
PCT Pub. Date: Feb. 23, 2023

(65) Prior Publication Data

US 2024/0367962 A1 Nov. 7, 2024

Related U.S. Application Data

(60) Provisional application No. 63/234,832, filed on Aug. 19, 2021.

(51) Int. Cl.
*B67D 1/00* (2006.01)
*B67D 1/08* (2006.01)
*B67D 1/12* (2006.01)

(52) U.S. Cl.
CPC ......... *B67D 1/0021* (2013.01); *B67D 1/0076* (2013.01); *B67D 1/0884* (2013.01); *B67D 1/1252* (2013.01)

(58) Field of Classification Search
CPC .. B67D 1/0021; B67D 1/0076; B67D 1/0884; B67D 1/1252
(Continued)

(56) References Cited

U.S. PATENT DOCUMENTS 4,869,396 A * 9/1989 Horino ................ B67D 1/1252 222/61
5,178,799 A * 1/1993 Brown ................ B01F 35/2209 261/DIG. 7
(Continued)

FOREIGN PATENT DOCUMENTS

WO WO 2023/022903 2/2023

OTHER PUBLICATIONS

Notice of Allowance for Canada Patent Application No. 3228995, dated Aug. 20, 2025, 3 pages.
(Continued)

*Primary Examiner* — David P Angwin
(74) *Attorney, Agent, or Firm* — Sheridan Ross PC

(57) ABSTRACT

An improved carbonation method, apparatus, and system includes a carbonation chamber, a temperature sensor, a pressure regulator, and a controller that determines a temperature of water entering the carbonation chamber and, when the temperature is above and outside of a predetermined temperature range, send a temperature adjustment to signal to a cooler to cool the water and, when the temperature is in the predetermined temperature range, determine whether a pressure of carbon dioxide gas entering the chamber should be adjusted corresponding to the specific temperature in the predetermined temperature range.

20 Claims, 3 Drawing Sheets

(58) Field of Classification Search
USPC ........................................................ 222/145.5
See application file for complete search history.

(56) References Cited

U.S. PATENT DOCUMENTS

| | | | | |
|---|---|---|---|---|
| 5,518,666 | A * | 5/1996 | Plester ................. | B67D 1/1252 261/DIG. 7 |
| 5,871,121 | A | 2/1999 | Hashimoto et al. | |
| 6,807,460 | B2 | 10/2004 | Black et al. | |
| 7,377,495 | B1 * | 5/2008 | Thompson ........... | G05D 16/187 261/DIG. 7 |
| 9,375,686 | B2 * | 6/2016 | Boarman .......... | B01F 35/22142 |
| 11,266,956 | B2 * | 3/2022 | Perkins ............. | B01F 23/23765 |
| 2012/0098148 | A1 | 4/2012 | Koslow et al. | |
| 2014/0099405 | A1 | 4/2014 | Boarman et al. | |
| 2017/0332829 | A1 | 11/2017 | Kim et al. | |
| 2019/0152759 | A1 * | 5/2019 | Renzi ................... | B67D 1/0888 |

OTHER PUBLICATIONS

Extended European Search Report for Europe Patent Application No. 22858958.6, dated Jun. 12, 2025, 9 pages.
International Search Report prepared by the United States Patent and Trademark Office on Sep. 29, 2022, for International Application No. PCT/US2022/039850, 4 pgs.
Written Opinion prepared by the United States Patent and Trademark Office on Sep. 29, 2022, for International Application No. PCT/US2022/039850, 7 pgs.
International Preliminary Report on Patentability for International (PCT) Patent Application No. PCT/US2022/039850, dated Feb. 29, 2024, 8 pages.
Examination Report and Notice of Intention to Grant for United Kingdom Patent Application No. GB2402944.9, dated Oct. 8, 2025, 2 pages.

* cited by examiner

METHODS AND SYSTEMS FOR MAINTAINING CARBONATION LEVELS IN BEVERAGES USING DYNAMIC CARBONATION PRECONDITIONING

CROSS-REFERENCE TO RELATED APPLICATIONS

This application is a national stage application under 35 U.S.C. § 371 and claims the benefit of PCT Application No. PCT/US2022/039850 having an international filing date of 9 Aug. 2022, which designated the United States, and which PCT application claims the benefit of priority and priority, under 35 U.S.C. § 119 (e), to U.S. Provisional Patent Application Ser. No. 63/234,832, filed on 19 Aug. 2021, entitled "METHODS AND SYSTEMS FOR MAINTAINING CARBONATION LEVELS IN BEVERAGES USING DYNAMIC CARBONATION PRECONDITIONING," the entire disclosure of each of which is hereby incorporated herein by reference, in its entirety, for all that it teaches and for all purposes.

BACKGROUND

The present disclosure is generally directed to carbonation systems, in particular, toward dynamically controlling the temperature and pressure used in producing carbonated beverages with consistent carbonation levels.

In general, carbonation corresponds to an impregnation of carbon dioxide gas in a liquid or beverage. The level of carbonation of a beverage may correspond to the volume of carbon dioxide measured per equal volume of the liquid making up the beverage at a given pressure and temperature. As the temperature of a beverage increases, the carbonation level of that beverage may decrease. This decrease may negatively affect the taste, aroma, and drinking experience associated with the beverage.

BRIEF SUMMARY

Conventional post-mix beverage systems typically operate under a fixed carbon dioxide pressure (e.g., where the carbon dioxide entering a carbonator is fixed at a set pressure value). This means that the carbonation level of the beverage will be dependent on the inlet water temperature used in the carbonation of the beverage. For instance, since the pressure is fixed in conventional systems, the variability in carbonation levels will be due to any variations in the water temperature used in carbonating. The conventional systems generally utilize filtered mains water, or tap water, (e.g., from a public water supply, etc.) as the water source. As can be appreciated, the temperature of the mains water may fluctuate depending on the season and ambient conditions (e.g., temperatures, pressures, humidity, etc.). In the United Kingdom alone, the mains water temperature main range between about 5° C. to 20° C. at various times of the year. Given this fluctuation in temperature, and using the conventional fixed-pressure carbonation system described above, a beverage carbonation level will move in a wide range being higher in the winter (e.g., when the water temperature of the mains water is colder) and lower in the summer (e.g., when the water temperature of the mains water is warmer). Among other things, this wide range of high and low carbonation levels results in an inconsistently carbonated beverage over time, and may contribute to great differences in taste, aroma, and mouth feel of the beverage depending on the ambient environmental conditions at the time that the beverage was carbonated.

In order to guarantee a constant carbonation level in the beverage, either the temperature of the inlet water has to be controlled at a constant level or the carbon dioxide pressure needs to be adjusted according to the inlet temperature of the water.

Among other things, the present disclosure provides a temperature and pressure controlled carbonation system that dynamically preconditions the water and/or the carbon dioxide gas used in carbonation that economically and efficiently addresses any variations in ambient environmental conditions when carbonating. In one embodiment, the temperature of the water is cooled to 13° C., in the summer (e.g., when water temperature is between 13° C. to 20° C.), and a digitally controlled regulator that adjusts the pressure to the carbonator bowl, or carbonator, to keep a constant carbonation level when the water temperature ranges between 5° C. and 13° C.

The methods and systems described herein, provide a carbonation system that is capable of delivering a consistent level of carbonation with varying water temperature feed. Moreover, in some embodiments the carbonation system may provide an environmentally friendly and efficient manner to maintaining consistent carbonation levels by only cooling the inlet water when necessary (e.g., when water temperature is above 13° C., etc.) and then by only cooling the inlet water to an upper (e.g., higher temperature) limit of an acceptable predetermined temperature range (e.g., to 13° C., etc.). In contrast, conventional systems that attempt to address the problems associated with temperature variability may use a cold carbonation system (e.g., a constantly refrigerated system, etc.) that guarantees consistent water temperature feed (e.g., essentially fixing the temperature at a low temperature, etc.) and therefore the gas pressure can be fixed. Unfortunately, these conventional systems are expensive and greatly increase energy usage (e.g., requiring a refrigeration system to continually run during operation, etc.). It is with respect to these issues and other problems that the embodiments presented herein were contemplated.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Numerous additional features and advantages are described herein and will be apparent to those skilled in the art upon consideration of the following Detailed Description and in view of the figures.

BRIEF DESCRIPTION OF THE SEVERAL VIEWS OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Figure 1:
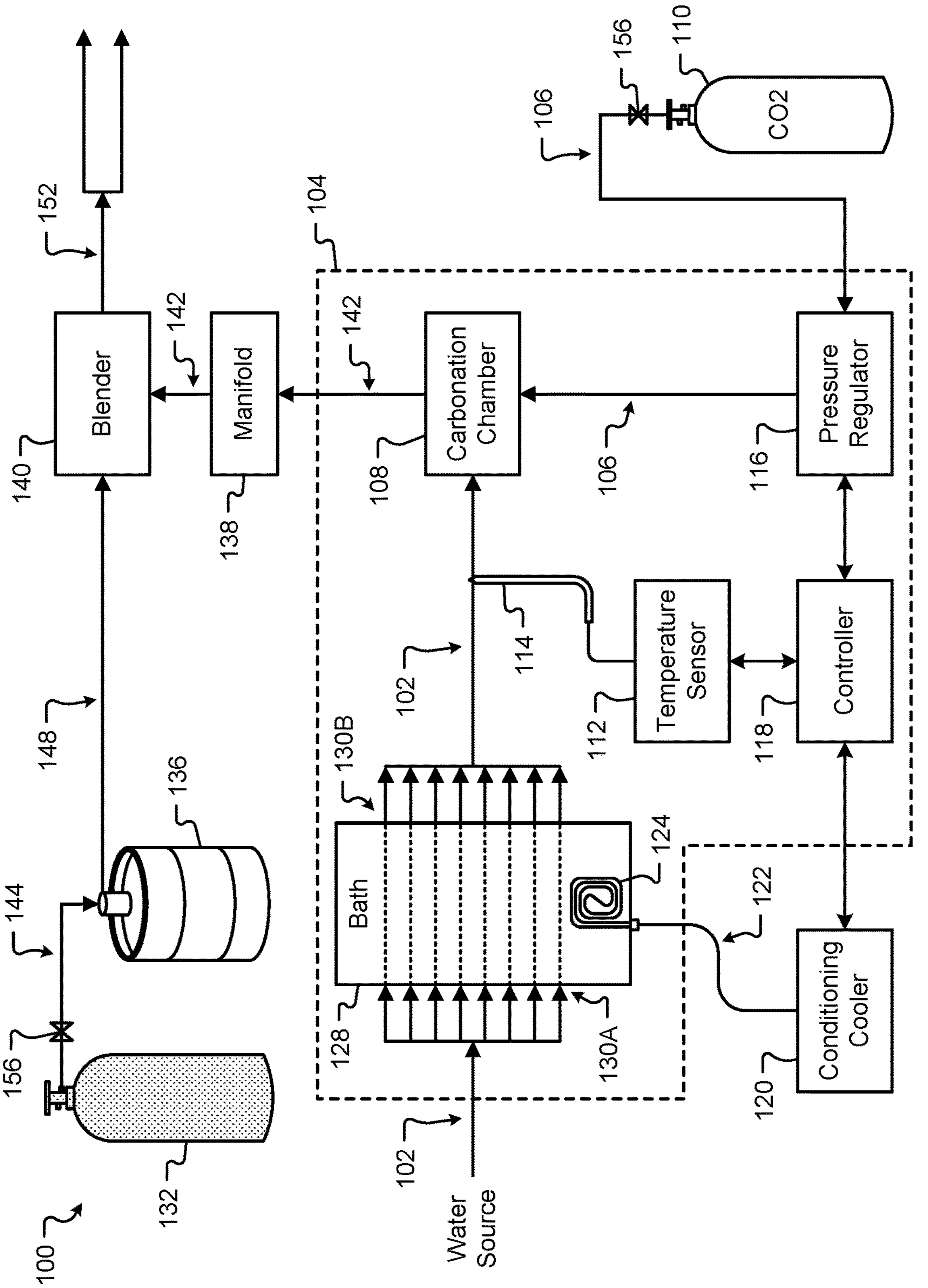
FIG. 1 shows a schematic block diagram of a temperature and pressure controlled carbonation system in accordance with embodiments of the present disclosure.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Various aspects of the present disclosure will be described herein with reference to drawings that may be schematic illustrations of idealized configurations.

In some embodiments, a carbonation preconditioning system is described that provides temperature conditioning of water inlet from the mains and automatic digital pressure regulation of the applied carbon dioxide on the carbonator. In one embodiment, where the inlet water temperature is higher than 13° C., the conditioning cooler may reduce the temperature of the inlet water (e.g., conveyed to the carbonator, etc.) to 13° C. A controller may then receive a sensed temperature of the water and determine a correct, related, pressure of the carbon dioxide entering the carbonation chamber according to the required carbonation level in the final product. When the related pressure is not the set pressure value at the pressure regulator (e.g., controlling the pressure of carbon dioxide gas entering the carbonation chamber, etc.), the controller may automatically send a digital signal instructing the pressure regulator to adjust the set pressure value to the related pressure determined for the sensed temperature of the water.

In some embodiments, when the water temperature is lower than 13° C., the controller may determine a related pressure for the carbon dioxide entering the carbonator. As the water temperature decreases, so does the related pressure of the carbon dioxide required to carbonate the water in the carbonation chamber at a predetermined carbonation level. In response, the controller may automatically send a digital signal instructing the pressure regulator to adjust the set pressure value to the related pressure determined for the temperature of the water that is lower than 13° C., and therefore the required carbonation level in the final product (e.g., beverage, etc.) is maintained. Among other things, the carbonation preconditioning system is capable of conditioning the temperature of water supplied (e.g., via cooling, etc.), from a water source, to a carbonation chamber and is capable of automatically regulating the pressure of carbon dioxide applied to the carbonation chamber in maintaining carbonation of the water at a predetermined carbonation level, regardless of ambient environmental conditions.

Referring now to FIG. 1, a schematic block diagram of a temperature and pressure controlled carbonation system 100 is shown in accordance with embodiments of the present disclosure. The temperature and pressure controlled carbonation system 100 may correspond to a post-mix draught system that uses ambient carbonation. In one embodiment, the temperature and pressure controlled carbonation system 100 may correspond to a beverage system that generates carbonated water and blends it with a decarbonated and dewatered product, for example, a beer beverage having a first alcohol by volume (ABV), to create a final diluted carbonated beer beverage of a second ABV that is less than the first ABV. The decarbonated and dewatered product may correspond to an ultra-high gravity (UHG) alcoholic beverage having an ABV of approximately 14.1% to 24% or 24.1% to 50%, etc. However, the temperature and pressure controlled carbonation system 100, as described herein, may dynamically control the carbonation level of any carbonated beverage including, but in no way limited to, ciders, seltzers, soft drinks, sodas (e.g., club sodas, etc.), and/or the like.

The temperature and pressure controlled carbonation system 100 may include a carbonation preconditioning system 104. The carbonation preconditioning system 104 includes a carbonation chamber 108, a first infeed line 102 that conveys water from a water source to the carbonation chamber 108, a second infeed line 106 that that conveys carbon dioxide gas from a carbon dioxide pressure vessel 110 to the carbonation chamber 108, a temperature sensor 112, a pressure regulator 116, and a controller 118 operatively connected to the temperature sensor 112 and the pressure regulator 116. In one embodiment, the carbonation preconditioning system 104 and/or the temperature and pressure controlled carbonation system 100 may include a conditioning cooler 120 and an ambient cooling bath 128.

Mains water may be directed along the first infeed line 102 from the water source (e.g., tap, pipes, etc.) to the ambient cooling bath 128. The ambient cooling bath 128 may be structured as a water, or other cooling fluid, bath that is configured to regulate a temperature of the first infeed line 102 and the mains water inside the first infeed line 102. One or more of the components of the temperature and pressure controlled carbonation system 100 may be disposed in a cool space (e.g., cellar, etc.) of a building where the ambient temperature (e.g., in an environment of the cool space) is naturally lower than other areas of the building. On average, the temperature in a typical cellar is about 13° C., plus or minus several degrees Celsius. In any event, the mass of the water in the ambient cooling bath 128 may come to a temperature equilibrium with the naturally cool environment of the cool space. By running the first infeed line 102 through the water in the ambient cooling bath 128, the temperature of the water flowing through the first infeed line 102 may be regulated to the temperature of the cellar, or the water in the ambient cooling bath 128, via conduction, etc. Stated another way, when the temperature of the mains water is higher than the temperature of the water in the ambient cooling bath 128, heat is transferred into the ambient cooling bath 128 (from the first infeed line 102) and the mains water in the first infeed line 102 is cooled. Additionally or alternatively, when the temperature of the mains water is lower than the temperature of the water in the ambient cooling bath 128, the greater thermal mass of the ambient cooling bath 128 may bring the temperature of the mains water in the first infeed line 102 up to the temperature of the water in the ambient cooling bath 128. In each instance, the ambient cooling bath 128 provides passive thermal conditioning of the first infeed line 102.

In some embodiments, the first infeed line 102 may be configured to enhance the passive cooling provided by the ambient cooling bath 128. For instance, the first infeed line 102 may split into a plurality of individual lines at a first point 130A of the ambient cooling bath 128 and the plurality of individual lines may be submerged in the water in the ambient cooling bath 128. The plurality of individual lines may exit the ambient cooling bath 128 at a second point 130B and fluidly interconnect with a single line of the first infeed line 102 extending from the ambient cooling bath 128 to the carbonation chamber 108. Among other things, separating the first infeed line 102 into a plurality of individual lines allows the first infeed line 102 to have greater surface area and contact with the water in the ambient cooling bath 128.

Although described as a passive thermal conditioning element, the ambient cooling bath 128 may be cooled via a conditioning, or remote, cooler 120 (e.g., a remote beer cooler, etc.) in some embodiments. For example, a cooling coil may be disposed in the water of the ambient cooling bath 128 and/or around one or more portions of the first infeed line 102 and configured to selectively cool in response to a digital signal provided by the controller 118. The conditioning cooler 120 may then cool a refrigerant that is conveyed along a cooling line 122 and through the cooling coil 124.

The mains water is conveyed from the water source along the first infeed line 102 to the carbonation chamber 108. The carbonation chamber 108 may correspond to a selectively sealable pressure chamber for receiving water and carbon dioxide in producing carbonated water. The carbonation chamber 108 may receive carbon dioxide at a controlled pressure from a carbon dioxide pressure vessel 110. The carbon dioxide pressure vessel 110 may correspond to a compressed gas tank. Carbon dioxide gas pressurized inside the carbon dioxide pressure vessel 110 may be conveyed along a second infeed line 106 to the carbonation chamber 108. The pressure of the carbon dioxide gas is controlled, or regulated, via the pressure regulator 116. In one embodiment, the pressure regulator 116 may correspond to a digital pressure regulator capable of adjusting and setting a flow pressure or flow rate for the carbon dioxide gas entering the carbonation chamber 108. The controller 118 may be a discrete component or may be a part of the pressure regulator 116. Details of the controller 118 are described in greater detail in conjunction with FIG. 2.

A temperature sensor 112 may receive temperatures measured by a temperature probe 114 in or about the first infeed line 102. In one embodiment, the temperature sensor 112 may be disposed between the water source and the carbonation chamber 108 configured to measure, or sense, a temperature of the water in the first infeed line 102. The temperature sensor 112 may convert electrical or mechanical energy detected by the temperature probe 114 into an electrical control signal that indicates a sensed temperature at any given time. The temperature probe 114 may be placed anywhere along the first infeed line 102. However, arranging the temperature probe 114 after the ambient cooling bath 128 allows the controller 118 to determine whether the passive thermal conditioning (e.g., cooling, etc.) provided by the ambient cooling bath 128 should be supplemented by active cooling provided by the conditioning cooler 120, the cooling line 122, and the cooling coil 124 (e.g., where the sensed temperature is above 13° C., etc.).

The temperature and pressure controlled carbonation system 100 operates to measure a temperature of the water entering the carbonation chamber 108 and then determine whether active cooling of the water is required (e.g., via a conditioning cooler 120, etc.) or whether a pressure of the carbon dioxide gas entering the carbonation chamber 108 should be adjusted to match the temperature of the water measured to achieve a specific carbonation level. In some cases, the water may be actively cooled to a specific temperature (e.g., within a predetermined temperature range) and then the pressure of the carbon dioxide gas entering the carbonation chamber 108 is adjusted to match the temperature of the water measured for a specific carbonation level. This operation is based on a specific, or predetermined, carbonation level for the water. Carbonation levels for the water may be measured in grams per liter (g/L) or some other measurable amount of carbon dioxide in a volume of water. The predetermined carbonation level for the water to be maintained across all temperatures in a predetermined temperature range may be any carbonation level value including, and between, 2 g/L to 6 g/L. The predetermined temperature range may be any temperature value including, and between, 0.1° C. (not freezing) to 13.5° C., 5° C. to 13° C., and/or 6° C. to 12.9° C.

When the temperature sensed by the temperature sensor 112 (and received by the controller 118) is above a predetermined upper limit temperature, the controller 118 may send a digital temperature adjustment signal to the conditioning cooler 120 to actively cool the ambient cooling bath 128 and the water being conveyed by the first infeed line 102. In one embodiment, the predetermined upper limit temperature may be 13° C. In one embodiment, rather than cooling the water to a temperature lower than the predetermined upper limit temperature (e.g., 13° C., etc.), the controller 118 may instruct the conditioning cooler 120 to cool the water to the predetermined upper limit temperature (e.g., 13° C., etc.). Among other things, this approach saves energy and allows the conditioning cooler 120 only to operate long enough to reach a temperature in the predetermined temperature range, albeit the upper limit of the predetermined temperature range. Further, by maintaining pressure control of the carbon dioxide gas entering the carbonation chamber 108 to a limited set of values (related to temperatures in the predetermined temperature range), the carbon dioxide gas required to reach a predetermined carbonation level may be conserved and is not wasted (as opposed to simply increasing the pressure as the temperature increases beyond the predetermined upper limit temperature, 13° C., etc.). Benefits of this approach include, but are in no way limited to, reducing environmental impact, reducing energy consumption, and prolonging the working life of the components of the temperature and pressure controlled carbonation system 100.

In some embodiments, the water entering the carbonation chamber 108 (e.g., via the first infeed line 102) may be sprayed into the carbonation chamber 108 allowing for enhanced surface contact with the carbon dioxide gas entering the carbonation chamber 108. Once the water is impregnated with the carbon dioxide gas entering the carbonation chamber 108 via the second infeed line 106, carbonated water is produced in the carbonation chamber 108. This carbonated water may be conveyed along a carbonated water line 142 to a manifold 138 and then a blender 140.

The manifold 138 may correspond to a four-way manifold that can be used with a plurality of different blenders 140. In this manner, a single carbonation preconditioning system 104 may be used to service multiple dispensing systems. The blender 140 may receive a decarbonated UHG beer conveyed from a beverage vessel 136 along the beer line 148 to a first inlet of the blender 140. In some embodiments, the decarbonated UHG beer may be moved out of the beverage vessel 136 through the beer line 148 via a compressed gas supplied by a pressure vessel 132. The beverage vessel 136 may correspond to a keg, tank, or other beer container.

The blender 140 may include a second inlet that receives the carbonated water from the carbonation chamber 108 (e.g., conveyed along the carbonated water line 142). Although not shown, the blender 140 may comprise a flow meter at the first inlet, a flow meter at the second inlet, and a gear pump that mixes, or combines, the decarbonated UHG beer with the carbonated water forming a carbonated beer beverage having an ABV that is less, or lower, than the ABV of the UHG beer. The carbonated beer beverage may then be conveyed along the carbonated beer beverage line 152 to a dispenser.

The temperature and pressure controlled carbonation system 100 may include one or more valves 156 along the lines 102, 106, 142, 144, 148, and/or between the various components of the temperature and pressure controlled carbonation system 100. The valves 156 may correspond to safety valves, pressure relief valves, solenoid valves, and/or the like.

Figure 2:
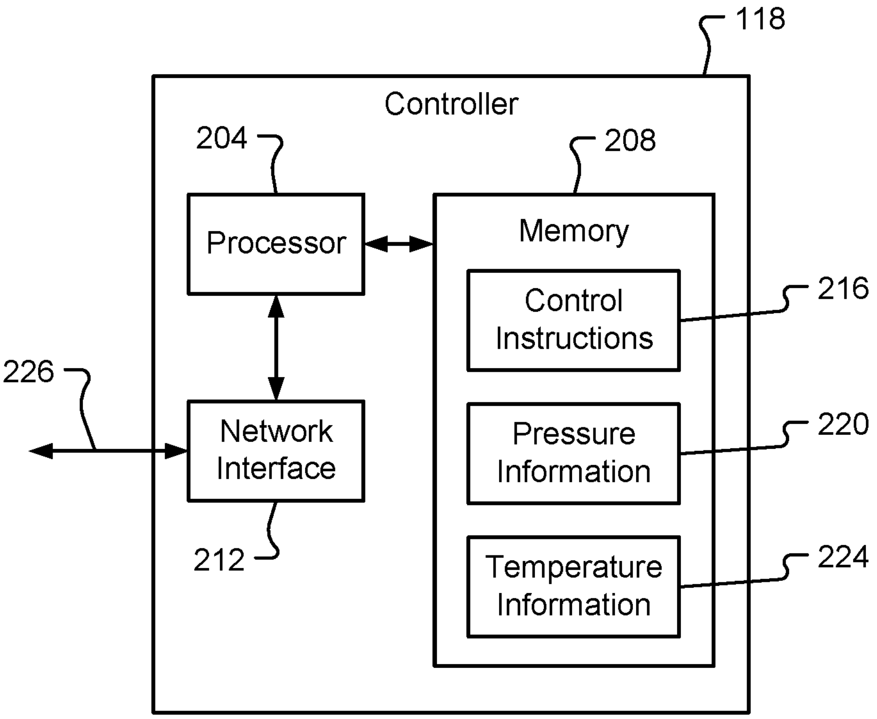
FIG. 2 is a block diagram depicting an illustrative controller in accordance with embodiments of the present disclosure.

FIG. 2 shows a block diagram depicting an illustrative controller 118 in accordance with embodiments of the present disclosure. The controller 118 may be a part of the pressure regulator 116 and/or any other component in the temperature and pressure controlled carbonation system 100. In some embodiments, the controller 118 may be separate and apart from the components of the temperature and pressure controlled carbonation system 100. In one embodiment, the controller 118 may comprise at least one of a programmable logic controller (PLC), synchronous link controller (SLC), industrial computer system, computer, mobile device, smartphone, combinations thereof, and/or the like. In any event, the controller 118 may include a processor 204, a memory 208, and a network interface 212.

The processor 204 may correspond to one or many computer processing devices. For instance, the processor 204 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 204 may be provided as a microprocessor, Central Processing Unit (CPU), or plurality of microprocessors that are configured to execute the instructions sets 216 stored in memory 208. Upon executing the instructions stored in memory 208, the processor 204 enables various device and system control in the temperature and pressure controlled carbonation system 100 including, but in no way limited to, conditioning cooler 120 control, pressure regulator 116 control, pump control, valve actuation (e.g., opening and closing, etc.), timers, PID control, etc., and/or combinations thereof.

The memory 208 may include any type of computer memory device or collection of computer memory devices. Non-limiting examples of the memory 208 may include Random Access Memory (RAM), Read Only Memory (ROM), flash memory, Electronically-Erasable Programmable ROM (EEPROM), Dynamic RAM (DRAM), etc. The memory 208 may be configured to store the instructions 216 depicted in FIG. 2 in addition to temporarily storing data for the processor 204 to execute various types of routines or functions. Although not depicted, the memory 208 may include instructions that enable the processor 204 to store and/or retrieve data in an automation or system control database.

The instruction sets and data stored in the memory 208 may include, but are in no way limited to, control instructions 216, pressure control information 220, temperature information 224, etc. Functions of the controller 118 enabled by these various instruction sets and data will be described in further detail herein. It should be appreciated that the instructions 216 depicted in FIG. 2 may be combined (partially or completely) with other instruction sets or may be further separated into additional and different instruction sets, depending upon configuration preferences for the controller 118. In any event, the particular instructions 216 depicted in FIG. 2 should not be construed as limiting embodiments described herein.

The control instruction set 216, when executed by the processor 204, may enable the controller 118 to manage one or more operations of the pressure regulator 116, conditioning cooler 120, and/or the carbonation chamber 108. The control instructions 216 may send signals (e.g., including commands, instructions, digital signals, voltage, etc.) across the bus 226 via the network interface 212. The control instructions 216 can control the pressure regulator 116 based on the temperature sensed by the temperature sensor 112 and can control the conditioning cooler 120 when a temperature sensed by the temperature sensor 112 exceeds a predetermined upper limit temperature. In some embodiments, the control instructions 216 may refer to pressure information 220 and/or temperature information 224 to set, adjust, and/or maintain a pressure of the carbon dioxide gas entering the carbonation chamber 108. In addition, the control instructions 216 may refer to the temperature information 224 to set, adjust, and/or maintain a temperature of the water entering the carbonation chamber 108.

As provided above, the network interface 212 may provide the controller 118 with the ability to send and receive communication packets or the like over the bus 226. The network interface 212 may be provided as a network interface card (NIC), a network port, drivers for the same, and the like. Communications between the components of the controller 118 and other devices in the temperature and pressure controlled carbonation system 100 may all flow through the network interface 226 of the controller 118. The bus 226 is illustrated as the double-arrowed connection between the controller 118 and other components in the temperature and pressure controlled carbonation system 100 of FIG. 1.

Figure 3:
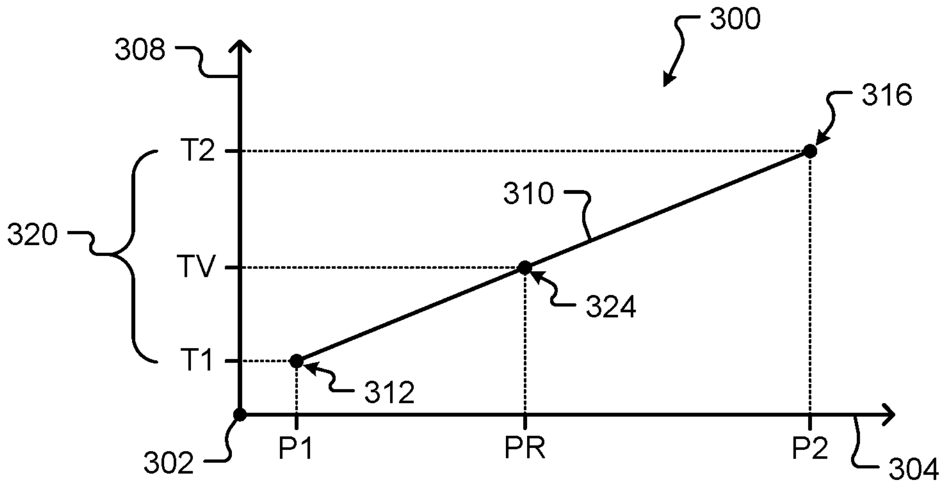
FIG. 3 shows a chart of related temperatures and pressures required to maintain a predetermined carbonation level in water in accordance with embodiments of the present disclosure.

FIG. 3 shows a chart 300 of related temperatures and pressures required to maintain a predetermined carbonation level in water in accordance with embodiments of the present disclosure. This temperature-pressure chart 300 may be stored in the pressure information 220 and/or the temperature information 224 of the memory 208. The temperature-pressure chart 300 may include a temperature-pressure line 310 defining a relationship between a sensed temperature value, TV, and a corresponding or related sensed temperature related pressure value, PR, for a predetermined carbonation level. The temperature-pressure chart 300 may be generated based on an understanding of the relationship between temperature and pressure (e.g., the ideal gas law, etc.) and how the temperature and pressure applies to a predetermined carbonation level in g/L.

The temperature-pressure chart 300 is shown having a horizontal axis 304 extending from an origin 302 to a first side and a vertical axis 308 extending from the origin 302 in a direction away from the horizontal axis 304. The vertical axis 308 corresponds to the temperature axis defining acceptable temperatures of water within a predetermined temperature range 320. These temperatures include a first temperature value, T1, corresponding to a lower limit of the predetermined temperature range 320 and a second temperature value, T2, corresponding to an upper limit of the predetermined temperature range 320.

Continuing the examples provided above, the predetermined temperature range 320 of the temperature-pressure chart 300 may correspond to the lower limit of 5° C. (e.g., the first temperature value, T1) to the upper limit of 13° C. (e.g., the second temperature value, T2). At the first temperature value, T1, of the water, the temperature-pressure chart 300 indicates the associated first related pressure value, P1, required for the carbon dioxide gas entering the carbonation chamber 108 to maintain a predetermined carbonation level in the water. For instance, following the first temperature value, T1, horizontally over to the temperature-pressure line 310 meets at a first relationship point 312, where taking a vertical line from the first relationship point 312 to the horizontal axis 304 indicates the first related pressure value, P1. At the second temperature value, T2, of the water, the temperature-pressure chart 300 indicates the associated second related pressure value, P2, required for the carbon dioxide gas entering the carbonation chamber 108 to maintain a predetermined carbonation level in the water. For example, following the second temperature value, T2, horizontally over to the temperature-pressure line 310 meets at a second relationship point 316, where taking a vertical line from the second relationship point 316 to the horizontal axis 304 indicates the second related pressure value, P2. When a sensed temperature value, TV, in the predetermined temperature range 320 is obtained, the controller 118 may determine the sensed temperature related pressure value, PR, by determining where the sensed temperature value, TV intersects with the temperature-pressure line 310 at a sensed relationship point 324. While shown in the form of a chart in FIG. 3 for illustrative purposes, it should be appreciated, that the relationships between the temperatures of the water and related pressures required to maintain a predetermined carbonation level in the water may be stored in the pressure information 220 and/or the temperature information 224 in the form of a table, list, database, and/or some other format that relates temperature to pressure for a specific carbonation level.

Figure 4:
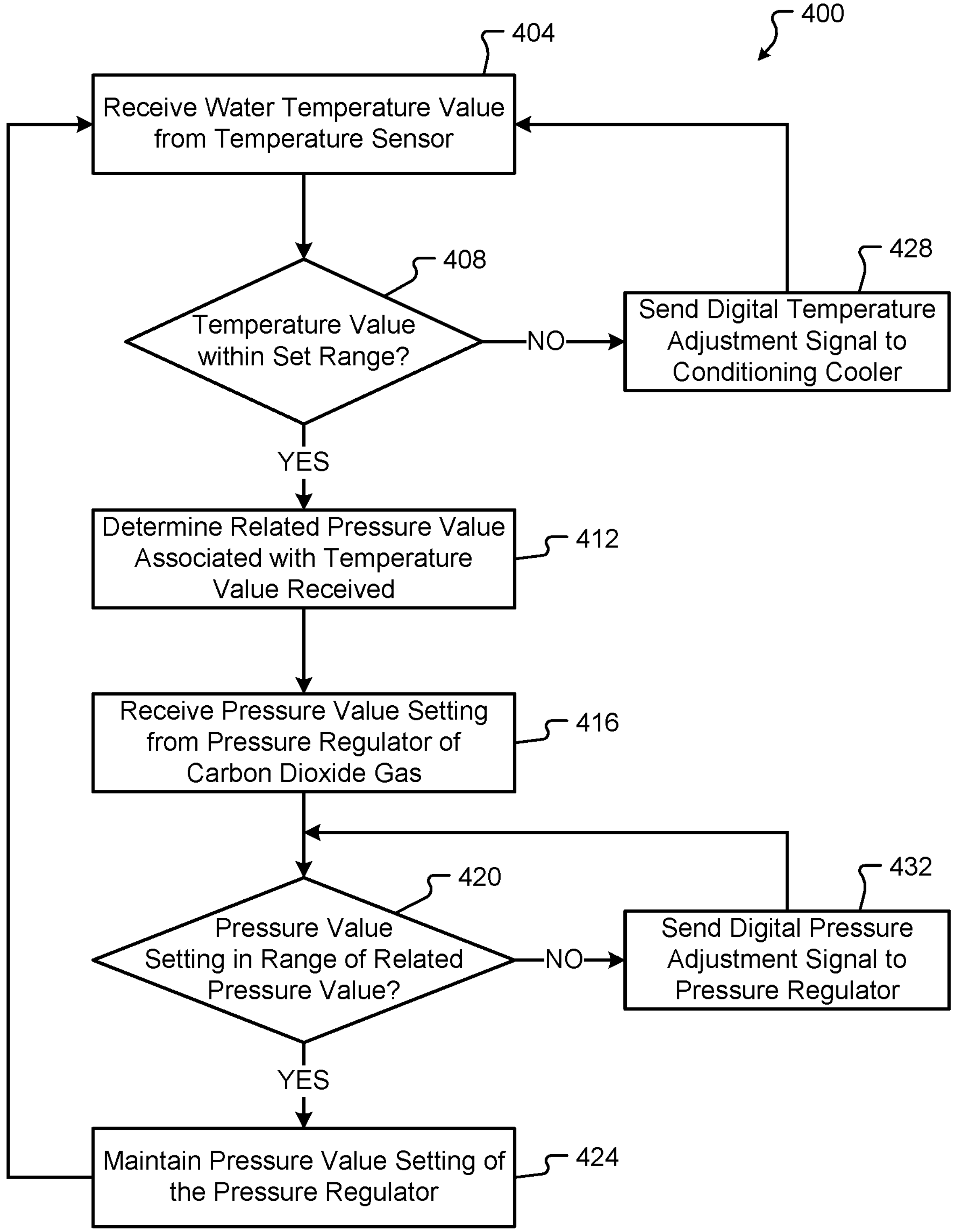
FIG. 4 is a flow diagram of a method of preconditioning water and carbon dioxide in maintaining a predetermined carbonation level in accordance with embodiments of the present disclosure.

FIG. 4 is a flow diagram of a method 400 of preconditioning water and carbon dioxide in maintaining a predetermined carbonation level in accordance with embodiments of the present disclosure. The method 400 can be executed as a set of computer-executable instructions (e.g., control instructions 216, etc.) executed by a computer system (e.g., the controller 118, the pressure regulator 116, etc.) and encoded or stored on a computer readable medium (e.g., the memory 208, etc.). Hereinafter, the method 400 shall be explained with reference to the systems, components, data structures, etc. described in conjunction with FIGS. 1-3.

The method 400 may begin at step 404 by the controller 118 receiving a sensed temperature value from the temperature sensor 112. The sensed temperature value may correspond to a temperature of the water being conveyed along the first infeed line 102.

Next, the method 400 continues by determining whether the sensed temperature value received is within a predetermined temperature range (step 408). The predetermined temperature range may correspond to the predetermined temperature range 320 described in conjunction with FIG. 3. In some embodiments, the method 400 may determine that the sensed temperature value exceeds an upper temperature limit in the predetermined temperature range. In this case, the method 400 may proceed to step 428. As described above, the controller 118 may actively cool the water entering the carbonation chamber 108 when the temperature of the water is sensed to be above a upper limit of the predetermined temperature range. In step 428, the method 400 may continue by sending a digital temperature adjustment signal to the conditioning cooler 120. In one embodiment, the digital temperature adjustment signal may instruct the conditioning cooler 120 to cool the first infeed line 102 to a temperature value in the predetermined temperature range. This temperature value may be the upper limit value (e.g., second temperature value, T2).

When the sensed temperature value is determined to be with the predetermined temperature range, the method 400 may proceed by determining a related pressure value associated with the sensed temperature value that is required to carbonate the water in the carbonation chamber 108 at a predetermined carbonation level (step 412). In one embodiment, this step may include the controller 118 referring to the temperature-pressure chart 300 and/or information stored in the memory 208. More specifically, the relationships between sensed temperatures and related pressures for maintaining a specific carbonation level may be stored in the pressure information 220 and/or temperature information 224.

The method 400 may continue by receiving the pressure value setting from the pressure regulator 116 (step 416). The pressure value setting may correspond to a current pressure setting for the pressure regulator 116 for the carbon dioxide gas entering the carbonation chamber 108. The pressure value setting may allow the carbon dioxide gas supplied by the carbon dioxide pressure vessel 110 to flow through the pressure regulator 116 at a particular flow rate. The method 400 continues by determining whether the pressure value setting for the pressure regulator 116 matches, or substantially matches, the related pressure value for the sensed temperature value obtained by the controller 118 (e.g., from the temperature-pressure chart 300, etc.) (step 420). In some embodiments, the method 400 may determine to maintain the pressure value setting of the pressure regulator 116 when the existing pressure value setting is within several pounds-per-square-inch (PSI), or bar, of the related pressure value obtained (step 424). Then, the method 400 may return to step 404 or end. In some embodiments, however, the method 400 may determine, at step 420, that the pressure value setting does not match the related pressure value obtained. In this case, the method 400 may proceed to send a digital pressure adjustment signal to the pressure regulator 116 instructing the pressure regulator to alter the pressure of the carbon dioxide gas entering the carbonation chamber 108 to the related pressure value (step 432). Once the pressure value setting of the pressure regulator 116 is the related pressure required to maintain the carbonation level, the carbonation preconditioning system 104 produces carbonated water at the predetermined carbonation level in the carbonation chamber 108.

Any of the steps, functions, and operations discussed herein can be performed continuously and automatically.

While the flowcharts have been discussed and illustrated in relation to a particular sequence of events, it should be appreciated that changes, additions, and omissions to this sequence can occur without materially affecting the operation of the disclosed embodiments, configuration, and aspects.

The exemplary systems and methods of this disclosure have been described in relation to post-mix draught systems that use ambient carbonation. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein. For instance, the systems and methods may be used to control predetermined carbonation levels of any other carbonated beverage or post-mix carbonated beverage such as ciders, seltzers, soft drinks, and/or the like.

A number of variations and modifications of the disclosure can be used. It would be possible to provide for some features of the disclosure without providing others.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in conjunction with one embodiment, it is submitted that the description of such feature, structure, or characteristic may apply to any other embodiment unless so stated and/or except as will be readily apparent to one skilled in the art from the description. The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Exemplary aspects are directed to a temperature and pressure controlled carbonation system, comprising: a carbonation chamber; a first infeed line that conveys water from a water source to the carbonation chamber; a second infeed line that conveys carbon dioxide gas from a carbon dioxide pressure vessel to the carbonation chamber; a temperature sensor disposed between the water source and the carbonation chamber; a conditioning cooler comprising at least one cooling coil, the cooling coil in cooling communication with the first infeed line; a pressure regulator disposed between the carbon dioxide pressure vessel and the carbonation chamber that regulates a pressure of the carbon dioxide gas entering the carbonation chamber; and a controller that receives a sensed temperature value from the temperature sensor, sends a digital temperature adjustment signal to the conditioning cooler when the sensed temperature value is higher than a temperature value in a predetermined temperature range instructing the conditioning cooler to cool the first infeed line to the temperature value in the predetermined temperature range, determines, when the sensed temperature value is the temperature value in the predetermined temperature range, a related pressure value associated with the sensed temperature value that carbonates the water in the carbonation chamber at a predetermined carbonation level, receives a pressure value setting of the pressure regulator, sends, when the pressure value setting is outside of a predetermined range from the related pressure value, a digital pressure adjustment signal to the pressure regulator instructing the pressure regulator to alter the pressure of the carbon dioxide gas entering the carbonation chamber to the related pressure value and produce carbonated water at the predetermined carbonation level in the carbonation chamber.

Any one or more of the above aspects include wherein the digital pressure adjustment signal causes the pressure regulator to decrease the pressure of the carbon dioxide gas when the sensed temperature value is at a first temperature value in the predetermined temperature range, and wherein the digital pressure adjustment signal causes the pressure regulator to decrease the pressure of the carbon dioxide gas when the sensed temperature value is at a second temperature value in the predetermined temperature range that is lower than the first temperature value. Any one or more of the above aspects include wherein a related pressure value associated with the first temperature value is higher than a related pressure value associated with the second temperature value, and wherein the predetermined carbonation level is identical for the first temperature value and the second temperature value. Any one or more of the above aspects include wherein the predetermined temperature range is 5 degrees Celsius to 13 degrees Celsius. Any one or more of the above aspects include wherein the water source is a public water source, and wherein the water is filtered before reaching the carbonation chamber. Any one or more of the above aspects include an ambient cooling bath disposed between the water source and the carbonation chamber, wherein the first infeed line enters the ambient cooling bath at a first point and exits the ambient cooling bath at a second point different from the first point, and wherein a length of the first infeed line is disposed in the ambient cooling bath between the first point and the second point. Any one or more of the above aspects include wherein the first infeed line is separated into a plurality of individual lines along the length of the first infeed line disposed in the ambient cooling bath, and wherein the first infeed line returns to a single line at a point between the length of the first infeed line and the carbonation chamber. Any one or more of the above aspects include wherein the temperature sensor is disposed in the first infeed line between the water source and the carbonation chamber and is in contact with the water conveyed to the carbonation chamber. Any one or more of the above aspects include wherein the cooling coil is disposed in the ambient cooling bath, and wherein the controller sends the digital temperature adjustment signal to the conditioning cooler only when the sensed temperature value is higher than 13 degrees Celsius. Any one or more of the above aspects include a beverage vessel comprising a decarbonated ultrahigh gravity beer having a first alcohol by volume percentage; a blender comprising a first inlet, a second inlet, and an outlet; a beer line disposed between the beverage vessel and the first inlet, the beer line configured to convey the decarbonated ultrahigh gravity beer to the blender; and a carbonated water line disposed between the carbonation chamber and the second inlet, wherein the carbonated water in the carbonation chamber is conveyed along the carbonated water line to the blender, and wherein the blender mixes the decarbonated ultrahigh gravity beer with the carbonated water forming a carbonated beer beverage having a second alcohol by volume percentage that is less than the first alcohol by volume percentage.

Exemplary aspects are directed to a method of producing a carbonated beverage, comprising: receiving, from a temperature sensor, a water temperature value of water supplied from a water source to a carbonation chamber; sending, when the water temperature value received is higher than a temperature value in a predetermined temperature range, a digital temperature adjustment signal across a communication network to a conditioning cooler that causes the conditioning cooler to cool the water to the temperature value in the predetermined temperature range; determining, when the water temperature value is the temperature value in the predetermined temperature range, a related pressure value associated with the water temperature value that carbonates the water in the carbonation chamber at a predetermined carbonation level, receiving, from a pressure regulator that regulates a pressure of carbon dioxide gas entering the carbonation chamber, a pressure value setting that defines the pressure of carbon dioxide gas entering the carbonation chamber; sending, when the pressure value setting is outside of a predetermined range from the related pressure value, a digital pressure adjustment signal to the pressure regulator that causes the pressure regulator to alter the pressure of the carbon dioxide gas entering the carbonation chamber to the related pressure value and produces carbonated water at the predetermined carbonation level in the carbonation chamber.

Any one or more of the above aspects include wherein the digital pressure adjustment signal causes the pressure regulator to decrease the pressure of the carbon dioxide gas when the water temperature value is at a first temperature value in the predetermined range, and wherein the digital pressure adjustment signal causes the pressure regulator to decrease the pressure of the carbon dioxide gas when the water temperature value is at a second temperature value in the predetermined range that is lower than the first temperature value. Any one or more of the above aspects further comprising: receiving, at a blender, decarbonated beer conveyed from a beverage vessel to the blender via a beer line; receiving, at the blender, the carbonated water at the predetermined carbonation level conveyed from the carbonation chamber to the blender via a carbonated water line; and mixing, in the blender, the decarbonated beer and the carbonated water forming a carbonated beer beverage. Any one or more of the above aspects include wherein an alcohol by volume of the carbonated beer beverage is lower than an alcohol by volume of the decarbonated beer.

Exemplary aspects are directed to a temperature and pressure controlled carbonation apparatus, comprising: a carbonation chamber comprising a water inlet, a carbon dioxide gas inlet, and a carbonated water outlet; a temperature sensor that measures a temperature of water entering the carbonation chamber through the water inlet; a pressure regulator that regulates a pressure of carbon dioxide gas entering the carbonation chamber through the carbon dioxide gas inlet; and a controller that receives a sensed temperature value from the temperature sensor, sends a digital temperature adjustment signal to a conditioning cooler to cool the water entering the carbonation chamber to the temperature value in the predetermined temperature range when the sensed temperature value is higher than a temperature value in a predetermined temperature range, determines, when the sensed temperature value is the temperature value in the predetermined temperature range, a related pressure value associated with the sensed temperature value that carbonates the water in the carbonation chamber at a predetermined carbonation level, receives a pressure value setting of the pressure regulator, sends, when the pressure value setting is outside of a predetermined range from the related pressure value, a digital pressure adjustment signal to the pressure regulator causing the pressure regulator to alter the pressure of the carbon dioxide gas entering the carbonation chamber to the related pressure value and produce carbonated water at the predetermined carbonation level in the carbonation chamber.

Any one or more of the above aspects further comprising: a cooling bath comprising a cooling fluid, wherein the water is conveyed through a plurality of individual lines, and wherein the plurality of individual lines are submerged in the cooling fluid of the cooling bath. Any one or more of the above aspects further comprising: a cooling coil disposed in the cooling fluid of the cooling bath, wherein the conditioning cooler is operatively coupled to the conditioning cooler via a cooling line, and wherein the conditioning cooler cools a refrigerant that is conveyed along the cooling line and through the cooling coil. Any one or more of the above aspects include wherein the temperature sensor comprises a temperature probe disposed along an infeed line extending from the cooling bath to the carbonation chamber. Any one or more of the above aspects include wherein the digital pressure adjustment signal causes the pressure regulator to decrease the pressure of the carbon dioxide gas when the sensed temperature value is at a first temperature value in the predetermined temperature range. Any one or more of the above aspects include wherein the digital pressure adjustment signal causes the pressure regulator to decrease the pressure of the carbon dioxide gas when the sensed temperature value is at a second temperature value in the predetermined temperature range that is lower than the first temperature value.

Any one or more of the above aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

It is to be appreciated that any feature described herein can be claimed in combination with any other feature(s) as described herein, regardless of whether the features come from the same described embodiment.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B, and C together. When each one of A, B, and C in the above expressions refers to an element, such as X, Y, and Z, or a class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The terms "determine," "calculate," "compute," and variations thereof, as used herein, are used interchangeably and include any type of methodology, process, mathematical operation, or technique.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

What is claimed is:

1. A temperature and pressure controlled carbonation system, comprising:

a carbonation chamber;

a first infeed line that conveys water from a water source to the carbonation chamber;

a second infeed line that conveys carbon dioxide gas from a carbon dioxide pressure vessel to the carbonation chamber;

a temperature sensor disposed between the water source and the carbonation chamber;

a conditioning cooler comprising at least one cooling coil, the at least one cooling coil in cooling communication with the first infeed line;

a pressure regulator disposed between the carbon dioxide pressure vessel and the carbonation chamber that regulates a pressure of the carbon dioxide gas entering the carbonation chamber; and a controller that receives a sensed temperature value from the temperature sensor, sends a digital temperature adjustment signal to the conditioning cooler when the sensed temperature value is higher than a temperature value in a predetermined temperature range instructing the conditioning cooler to cool the first infeed line to the temperature value in the predetermined temperature range, determines, when the sensed temperature value is the temperature value in the predetermined temperature range, a related pressure value associated with the sensed temperature value that carbonates the water in the carbonation chamber at a predetermined carbonation level, receives a pressure value setting of the pressure regulator, sends, when the pressure value setting is outside of a predetermined range from the related pressure value, a digital pressure adjustment signal to the pressure regulator instructing the pressure regulator to alter the pressure of the carbon dioxide gas entering the carbonation chamber to the related pressure value and produce carbonated water at the predetermined carbonation level in the carbonation chamber.

2. The temperature and pressure controlled carbonation system of claim 1, wherein the digital pressure adjustment signal causes the pressure regulator to decrease the pressure of the carbon dioxide gas when the sensed temperature value is at a first temperature value in the predetermined temperature range, and wherein the digital pressure adjustment signal causes the pressure regulator to decrease the pressure of the carbon dioxide gas when the sensed temperature value is at a second temperature value in the predetermined temperature range that is lower than the first temperature value.

3. The temperature and pressure controlled carbonation system of claim 2, wherein a related pressure value associated with the first temperature value is higher than a related pressure value associated with the second temperature value, and wherein the predetermined carbonation level is identical for the first temperature value and the second temperature value.

4. The temperature and pressure controlled carbonation system of claim 3, wherein the predetermined temperature range is 5 degrees Celsius to 13 degrees Celsius.

5. The temperature and pressure controlled carbonation system of claim 4, wherein the water source is a public water source, and wherein the water is filtered before reaching the carbonation chamber.

6. The temperature and pressure controlled carbonation system of claim 4, further comprising:

an ambient cooling bath disposed between the water source and the carbonation chamber, wherein the first infeed line enters the ambient cooling bath at a first point and exits the ambient cooling bath at a second point different from the first point, and wherein a length of the first infeed line is disposed in the ambient cooling bath between the first point and the second point.

7. The temperature and pressure controlled carbonation system of claim 6, wherein the first infeed line is separated into a plurality of individual lines along the length of the first infeed line disposed in the ambient cooling bath, and wherein the first infeed line returns to a single line at a point between the length of the first infeed line and the carbonation chamber.

8. The temperature and pressure controlled carbonation system of claim 7, wherein the temperature sensor is disposed in the first infeed line between the water source and the carbonation chamber and is in contact with the water conveyed to the carbonation chamber.

9. The temperature and pressure controlled carbonation system of claim 8, wherein the at least one cooling coil is disposed in the ambient cooling bath, and wherein the controller sends the digital temperature adjustment signal to the conditioning cooler only when the sensed temperature value is higher than 13 degrees Celsius.

10. The temperature and pressure controlled carbonation system of claim 8, further comprising:

a beverage vessel comprising a decarbonated ultrahigh gravity beer having a first alcohol by volume percentage;

a blender comprising a first inlet, a second inlet, and an outlet;

a beer line disposed between the beverage vessel and the first inlet, the beer line configured to convey the decarbonated ultrahigh gravity beer to the blender; and a carbonated water line disposed between the carbonation chamber and the second inlet, wherein the carbonated water in the carbonation chamber is conveyed along the carbonated water line to the blender, and wherein the blender mixes the decarbonated ultrahigh gravity beer with the carbonated water forming a carbonated beer beverage having a second alcohol by volume percentage that is less than the first alcohol by volume percentage.

11. A method of producing a carbonated beverage, comprising:

receiving, from a temperature sensor, a water temperature value of water supplied from a water source to a carbonation chamber;

sending, when the water temperature value received is higher than a temperature value in a predetermined temperature range, a digital temperature adjustment signal across a communication network to a conditioning cooler that causes the conditioning cooler to cool the water to the temperature value in the predetermined temperature range;

determining, when the water temperature value is the temperature value in the predetermined temperature range, a related pressure value associated with the water temperature value that carbonates the water in the carbonation chamber at a predetermined carbonation level, receiving, from a pressure regulator that regulates a pressure of carbon dioxide gas entering the carbonation chamber, a pressure value setting that defines the pressure of carbon dioxide gas entering the carbonation chamber; and sending, when the pressure value setting is outside of a predetermined range from the related pressure value, a digital pressure adjustment signal to the pressure regulator that causes the pressure regulator to alter the pressure of the carbon dioxide gas entering the carbonation chamber to the related pressure value and produces carbonated water at the predetermined carbonation level in the carbonation chamber.

12. The method of claim 11, wherein the digital pressure adjustment signal causes the pressure regulator to decrease the pressure of the carbon dioxide gas when the water temperature value is at a first temperature value in the predetermined range, and wherein the digital pressure adjustment signal causes the pressure regulator to decrease the pressure of the carbon dioxide gas when the water temperature value is at a second temperature value in the predetermined range that is lower than the first temperature value.

13. The method of claim 11, further comprising:

receiving, at a blender, decarbonated beer conveyed from a beverage vessel to the blender via a beer line;

receiving, at the blender, the carbonated water at the predetermined carbonation level conveyed from the carbonation chamber to the blender via a carbonated water line; and mixing, in the blender, the decarbonated beer and the carbonated water forming a carbonated beer beverage.

14. The method of claim 13, wherein an alcohol by volume of the carbonated beer beverage is lower than an alcohol by volume of the decarbonated beer.

15. A temperature and pressure controlled carbonation apparatus, comprising:

a carbonation chamber comprising a water inlet, a carbon dioxide gas inlet, and a carbonated water outlet;

a temperature sensor that measures a temperature of water entering the carbonation chamber through the water inlet;

a pressure regulator that regulates a pressure of carbon dioxide gas entering the carbonation chamber through the carbon dioxide gas inlet; and a controller that receives a sensed temperature value from the temperature sensor, sends a digital temperature adjustment signal to a conditioning cooler to cool the water entering the carbonation chamber to a temperature value in a predetermined temperature range when the sensed temperature value is higher than the temperature value in the predetermined temperature range, determines, when the sensed temperature value is the temperature value in the predetermined temperature range, a related pressure value associated with the sensed temperature value that carbonates the water in the carbonation chamber at a predetermined carbonation level, receives a pressure value setting of the pressure regulator, sends, when the pressure value setting is outside of a predetermined range from the related pressure value, a digital pressure adjustment signal to the pressure regulator causing the pressure regulator to alter the pressure of the carbon dioxide gas entering the carbonation chamber to the related pressure value and produce carbonated water at the predetermined carbonation level in the carbonation chamber.

16. The temperature and pressure controlled carbonation apparatus of claim 15, further comprising:

a cooling bath comprising a cooling fluid, wherein the water is conveyed through a plurality of individual lines, and wherein the plurality of individual lines are submerged in the cooling fluid of the cooling bath.

17. The temperature and pressure controlled carbonation apparatus of claim 16, further comprising:

a cooling coil disposed in the cooling fluid of the cooling bath, wherein the conditioning cooler is operatively coupled to the conditioning cooler via a cooling line, and wherein the conditioning cooler cools a refrigerant that is conveyed along the cooling line and through the cooling coil.

18. The temperature and pressure controlled carbonation apparatus of claim 17, wherein the temperature sensor comprises a temperature probe disposed along an infeed line extending from the cooling bath to the carbonation chamber.

19. The temperature and pressure controlled carbonation apparatus of claim 15, wherein the digital pressure adjustment signal causes the pressure regulator to decrease the pressure of the carbon dioxide gas when the sensed temperature value is at a first temperature value in the predetermined temperature range.

20. The temperature and pressure controlled carbonation apparatus of claim 19, wherein the digital pressure adjustment signal causes the pressure regulator to decrease the pressure of the carbon dioxide gas when the sensed temperature value is at a second temperature value in the predetermined temperature range that is lower than the first temperature value.

* * * * *